United States Patent
Kumar et al.

(10) Patent No.: US 6,952,639 B2
(45) Date of Patent: Oct. 4, 2005

(54) METHOD AND SYSTEM FOR TEMPERATURE ESTIMATION OF GAS TURBINE COMBUSTION CANS

(75) Inventors: Aditya Kumar, Niskayuna, NY (US); Nishith Pramod Vora, Warminster, PA (US); Bruce G. Norman, Ballston Lake, NY (US); Pierino G. Bonanni, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 84 days.

(21) Appl. No.: 10/065,710

(22) Filed: Nov. 12, 2002

(65) Prior Publication Data

US 2004/0093147 A1 May 13, 2004

(51) Int. Cl.[7] .............................. F02C 9/16; F02C 9/50; F02M 7/00
(52) U.S. Cl. ........................ 701/100; 374/101; 702/130
(58) Field of Search .......................... 701/100; 374/101, 374/144; 702/130; 60/39.281, 39.15, 39.182, 602, 603, 773, 39.27; 123/435, 676

(56) References Cited

U.S. PATENT DOCUMENTS

| | | | | |
|---|---|---|---|---|
| 2,731,794 A | * | 1/1956 | Torell | 60/39.281 |
| 3,377,848 A | * | 4/1968 | Marvin | 73/117.3 |
| 4,055,997 A | * | 11/1977 | Kniat | 73/117.3 |
| 5,533,329 A | * | 7/1996 | Ohyama et al. | 60/773 |
| 5,622,042 A | * | 4/1997 | Mirsky et al. | 60/773 |
| 6,619,261 B1 | * | 9/2003 | Wang et al. | 123/435 |
| 6,668,537 B1 | * | 12/2003 | Hays | 60/39.182 |

* cited by examiner

Primary Examiner—Tan Q. Nguyen
Assistant Examiner—Dalena Tran
(74) Attorney, Agent, or Firm—Cantor Colburn LLP

(57) ABSTRACT

A method for estimating a temperature profile for individual combustion cans at an inlet of a gas turbine is disclosed. In an exemplary embodiment, the method includes determining an exhaust temperature profile of exhaust gas of the gas turbine, and inputting the exhaust temperature profile into a model-based estimator of turbine components through which turbine gas flows. The model-based estimator calculates an estimated inlet temperature profile at the gas turbine inlet, based upon the exhaust temperature profile and design parameters of the gas turbine, the estimate inlet temperature profile being indicative of the actual firing temperature of each of the individual combustion cans.

20 Claims, 8 Drawing Sheets

| Measurement | | | | | | | | | Model | | |
|---|---|---|---|---|---|---|---|---|---|---|---|
| MW | CPD (psig) | CPD (psia) | CPDa (atm) | CPR (calc) | TTRF (F) | | CTD (F) | IGV (deg) | Tinp@peak(F) | Tinp@trough (F) | TTRF (F) |
| 69.7 | 195.2 | 209.63 | 14.26 | 14.53 | 2365 | | 694 | 84.2 | 2485 | 2235 | 2367 |
| 65 | 191 | 205.43 | 13.98 | 14.24 | 2310 | | 686 | 83.9 | 2430 | 2180 | 2311.9 |
| 60.1 | 179.2 | 193.63 | 13.18 | 13.42 | 2299 | | 670 | 75.6 | 2418 | 2168 | 2289.8 |
| 55.1 | 168.9 | 183.33 | 12.47 | 12.70 | 2286 | | 659 | 68.4 | 2405 | 2155 | 2286 |
| 50 | 156.8 | 171.23 | 11.65 | 11.87 | 2277 | | 643 | 61.9 | 2395 | 2145 | 2276.8 |
| 45 | 145.6 | 160.03 | 10.89 | 11.09 | 2250 | | 633 | 56.7 | 2370 | 2120 | 2251.7 |

Fig. 5

METHOD AND SYSTEM FOR TEMPERATURE ESTIMATION OF GAS TURBINE COMBUSTION CANS

BACKGROUND OF INVENTION

The present disclosure relates generally to industrial power plant machinery and, more particularly, to a method and system for temperature estimation of gas turbine combustion cans.

Gas turbines generally include a compressor and turbine arranged on a rotating shaft(s), and a combustion section between the compressor and turbine. The combustion section burns a mixture of compressed air and liquid and/or gaseous fuel to generate a high-energy combustion gas stream that drives the rotating turbine. The turbine rotationally drives the compressor and provides output power. Industrial gas turbines are often used to provide output power to drive an electrical generator or motor. Other types of gas turbines may be used as aircraft engines, on-site and supplemental power generators, and for other applications.

Certain gas turbines include several tangentially located combustor cans that burn fuel in high-pressure compressed air to isobarically raise the temperature of the resulting gaseous mixture. The resulting hot gas is fed to a multi-stage turbine (known to those skilled in the art as a combination of nozzles and buckets, or stators and rotors in each stage), where the gas performs the work for generating electricity, for example. It is desirable to maintain uniform combustion temperature, and thus, uniform firing temperature for each combustor can. However, variations between individual combustor cans may lead to differences in the firing temperature from each can. Such can-to-can variations adversely affect operability and efficiency of the gas turbine. Because of the extreme high-pressure, high-temperature environment in combustor cans, a direct measurement of the gas temperature is not available, and is therefore indirectly estimated through available measured parameters.

One way of obtaining an estimate of the degree of can-to-can variations is to measure exhaust temperature by using a multitude of tangentially placed thermocouples in the exhaust diffuser, and thereafter monitoring the spread (i.e., the difference between the maximum and minimum temperatures measured by the thermocouples). However, this method is only capable of identifying relatively large can-to-can variations as a result of, for example, a flame blowout in a particular can, and is not sufficient to identify individual hot or cold cans since it does not take into consideration the rotational swirl and mixing effects of the gas as it passes from the combustion cans through the nozzle and bucket stages of the turbine.

On the other hand, swirl maps have also been used to estimate the total rotation (i.e., the swirl of the gas from the cans to the exhaust) and thus map hot spots and cold spots in the exhaust gas, as identified by the exhaust thermocouple measurements to the individual cans. Unfortunately, since the rotation of the gas is not necessarily the same from can to can, as well as from load condition to load condition, the visual interpretation of a swirl map in estimating the gas temperature of individual combustion cans is a difficult proposition. This is especially the case for a turbine having a large number of combustion cans.

SUMMARY OF INVENTION

The above discussed and other drawbacks and deficiencies of the prior art are overcome or alleviated by a method for estimating a temperature profile for individual combustion cans at an inlet of a gas turbine. In an exemplary embodiment, the method includes determining an exhaust temperature profile of exhaust gas of the gas turbine at a fixed load condition, and inputting the exhaust temperature profile into a model-based estimator that uses a model of turbine components through which turbine gas flows. The model-based estimator calculates an estimated inlet temperature profile at the gas turbine inlet, based upon the exhaust temperature profile and design parameters of the gas turbine, the estimated inlet temperature profile being indicative of the actual firing temperature of each of the individual combustion cans.

In another aspect, a method for estimating a temperature profile for individual combustion cans at an inlet of a gas turbine includes obtaining exhaust temperature data from exhaust of the gas turbine and normalizing the exhaust temperature data to a reference load condition to obtain a normalized exhaust temperature profile. The normalized exhaust temperature profile is then inputted into a model-based estimator of turbine components through which turbine gas flows. The model-based estimator calculates an estimated inlet temperature profile at the gas turbine inlet, based upon the normalized exhaust temperature profile and design parameters of the gas turbine, the estimate inlet temperature profile being indicative of the actual firing temperature of each of the individual combustion cans.

In still another aspect, a system for estimating a temperature profile for individual combustion cans disposed at an inlet of a gas turbine includes a plurality of exhaust temperature sensing devices disposed proximate exhaust gas of the gas turbine. A normalization mechanism receives exhaust temperature data from the plurality of exhaust temperature sensing devices, the normalization mechanism producing a normalized exhaust temperature profile with respect to a reference load condition. A model-based estimator of turbine components, through which turbine gas flows, receives the normalized exhaust temperature profile and calculates an estimated inlet temperature profile at the gas turbine inlet, based upon the normalized exhaust temperature profile and design parameters of the gas turbine. The estimate inlet temperature profile is indicative of the actual firing temperature of each of the individual combustion cans.

BRIEF DESCRIPTION OF DRAWINGS

Referring to the exemplary drawings wherein like elements are numbered alike in the several Figures:

FIG. 5 is a table summarizing the simulation results of a developed, physics-based model using actual design parameters of a General Electric 6FA machine, in comparison to measured variations during a slow unload of a General Electric 6FA machine;

DETAILED DESCRIPTION

Figure 1:
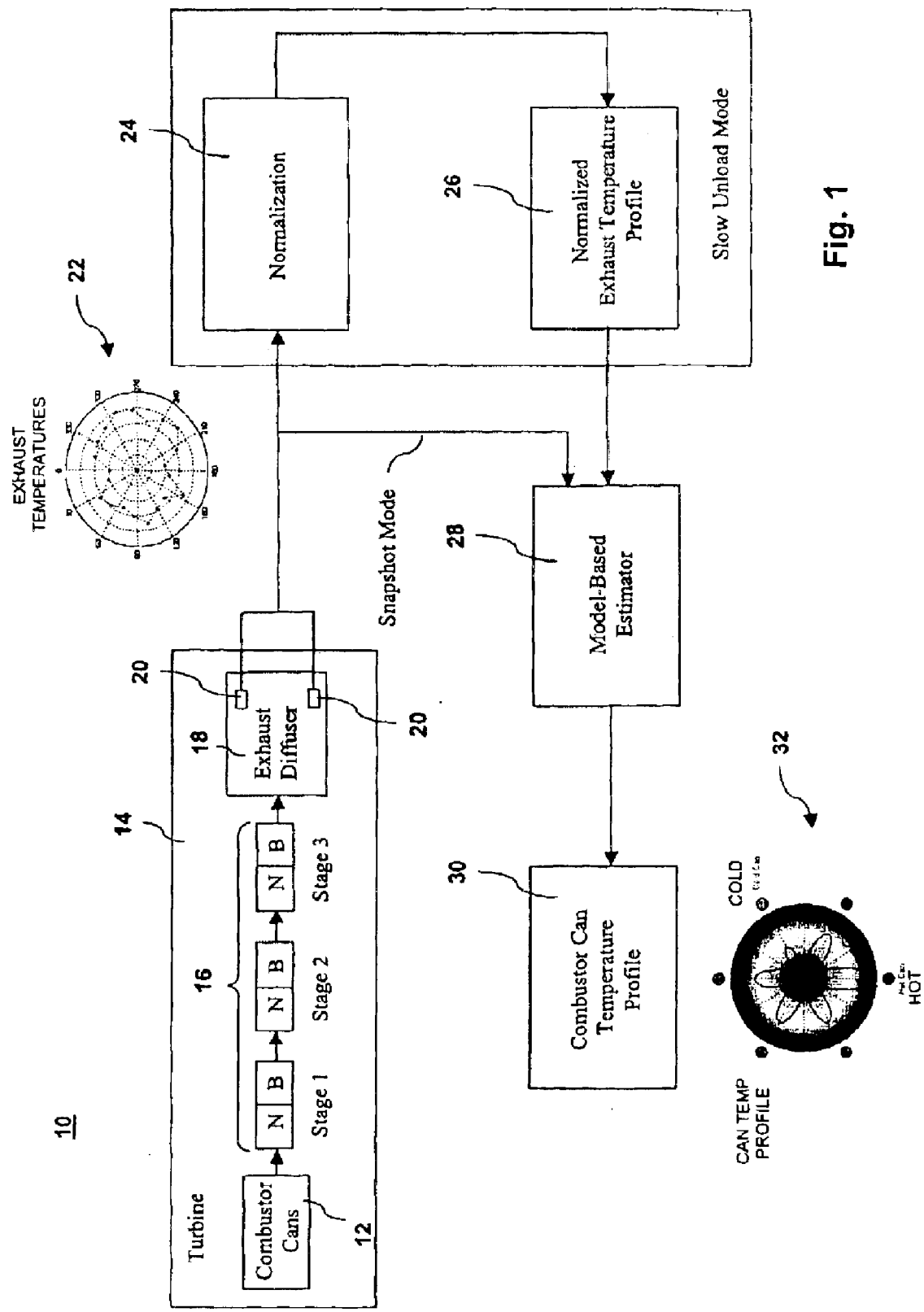
FIG. 1 is a schematic block diagram of a temperature estimation system for estimating combustion temperature for individual combustor cans of a gas turbine, in accordance with an embodiment of the invention.

Disclosed herein is a method and system for implementing a model-based estimation of combustion temperature for individual combustor cans located at the inlet, as well as the corresponding temperature profile along the length of a gas turbine machine. Briefly stated, the turbine inlet temperature is estimated from exhaust temperature measurements taken from a plurality of exhaust thermocouples located along various angular positions about a longitudinal axis of the turbine. In a first mode (referred to hereinafter as a "snapshot" estimation mode), the exhaust temperature profile obtained at a fixed load condition is used in a model-based estimator to estimate the turbine inlet temperature profile from the individual combustor cans. The model-based estimator incorporates a steady-state physics-based model that describes the variation of pressure, temperature and velocity of the gaseous mixture from the turbine inlet to the exhaust, using fundamental physical balances.

The physics-based model systematically captures the effect of mixing and swirl and their variation with load conditions, and thus provides a relationship between the inputs (i.e., the unknown inlet temperature profile from the combustion cans and the measured compressor discharge pressure and temperature) and the outputs (i.e., the measured exhaust temperature profile). The model-based estimator then essentially performs an "inversion" to calculate the unknown turbine inlet temperature profile from the combustion cans from the measurements of exhaust temperature and compressor discharge pressure and temperature.

In a second mode (referred to hereinafter as a "slow unload" estimation mode), the turbine operation is varied in a slowly controlled manner over a sufficiently wide load range, e.g., from base-load to part-load. The variation in load results in a variation in swirl, which in turn corresponds to a rotation in the exhaust temperature profile. This allows for the measurement of the exhaust temperature profile at different tangential locations using the same finite number of thermocouples at fixed tangential locations. The sequence of exhaust temperature measurements over the varying load range is then normalized (i.e., corrected for variations in swirl and average exhaust temperature) to obtain a more detailed measurement of the exhaust temperature profile than possible by using the finite set of thermocouples at a fixed load (as done in the snapshot mode).

Moreover, the slow unload range (and thus the corresponding swirl variation) can be selected to be large enough such that it covers the gap between neighboring exhaust thermocouples, thereby allowing cross-comparison of measurements from neighboring thermocouples for the same hot/cold spots in the exhaust profile, and identifying any thermocouple-to-thermocouple measurement bias. The normalized exhaust data is filtered to obtain a mean exhaust temperature profile that is less susceptible to individual thermocouple measurement bias. This detailed and more accurate normalized exhaust temperature profile is used in the same model-based estimator to obtain a more robust estimate of the turbine inlet temperature profile from the combustion cans, which is more accurate and less susceptible to exhaust thermocouple measurement biases than the snapshot estimation mode at a fixed load condition.

Referring initially to FIG. 1, there is shown a schematic block diagram of a temperature estimation system 10 for estimating combustion temperature for individual combustor cans 12 of a gas turbine 14, in accordance with an embodiment of the invention. As is shown schematically in FIG. 1, the turbine 14 includes three turbine stages 16, each comprised of a nozzle (or stator) section "N" and a bucket (or rotor) section "B". However, those skilled in the art will appreciate that the turbine configuration shown in FIG. 1 is exemplary in nature, and that the estimation system 10 is applicable to other configurations having a different number of turbine stages. It should also be noted that the block schematically depicting the turbine 14 does not show the upstream compressor portion thereof the turbine.

As stated previously, it is desired to have an accurate combustion temperature profile of the combustor cans 12, since it is not feasible to implement direct thermocouple measurements thereof. In an exemplary embodiment utilizing a General Electric 6FA gas turbine, there are six combustor cans 12 disposed in a circumferential manner about a longitudinal axis (z-axis) of the turbine 14. Thus, a polar coordinate axis (or θ-axis), tangential to the z-axis, is helpful in describing the temperature profile of the combustor cans 12, positioned about 60 degrees apart from one another along the θ-axis. It will be appreciated, however, that the disclosed estimation embodiments are not solely restricted to a 6FA machine, and are equally applicable to gas turbines with more or less combustion cans using the design parameters for the specific turbine in the model.

The compressed intake gas, once ignited, is passed through the three bucket/nozzle turbine stages 16, thereby providing rotational output power. Once the gas passes through the third stage, it is still at a relatively high temperature and velocity and is thus passed through an exhaust diffuser 18 to reduce the gas velocity, after which the gas may be reclaimed for other useful work. Within the exhaust diffuser 18, there are located a number of temperature thermocouples 20 that directly measure the temperature of the exhaust gas. For ease of illustration, only two thermocouples 20 are shown in FIG. 1. Preferably, however, there will be at least twice the number of thermocouples 20 as there are combustor cans 12. In an exemplary embodiment (as well as in the simulations discussed later for the General Electric 6FA turbine), there are 21 thermocouples 20 uniformly and tangentially disposed about the z-axis of the turbine at a fixed radial insertion depth. Thus, each thermocouple is spaced about 17.14 degrees apart from one another along the θ-axis.

Based upon the reading of the individual thermocouples 20, an exhaust temperature profile 22 may be determined, as exemplified by the polar coordinate graph. The temperature detected by each thermocouple 20 is used to generate a representation of the exhaust temperature gas with respect to angular position about the z-axis. As can be seen, the temperature of the gas can vary, depending upon its angular position. Such a variance is indicative of a variance in the firing temperatures of the combustor cans, but as stated previously, with an increasing number of combustor cans it is difficult to relate this information back to the combustor can temperatures through conventional means.

In the snapshot estimation mode, the exhaust temperature profile 22 as measured by the exhaust thermocouples 20 at a fixed load condition are used directly in the model-based estimator 28 to calculate the unknown inlet temperature profile from the combustion cans, as shown in block 30 and the polar plot in 32 for the 6FA turbine example with 6 cans. The estimated can temperatures are then compared to identify relatively hot or cold cans as further shown in plot 32. The model-based estimator 28 incorporates a nonlinear, steady state model that relates the unknown turbine inlet temperature profile from the cans 12 (and other measured inputs like compressor discharge pressure and temperature) to the measured exhaust temperature profile 22.

The model is based upon fundamental physical balances over each nozzle and bucket sequence in the three turbine stages 16 and the exhaust diffuser 18. A linear approximation of the nonlinear model is obtained at specified fixed load operating conditions and is then used in an inversion approach to estimate the turbine inlet profile from the combustion cans 12, with the peaks thereof corresponding to the firing temperatures ($T_{fire}$) for each can and the troughs corresponding to the locations between adjacent cans. These peaks and troughs are also shown in polar plot 32.

In another embodiment, and in contrast to the snapshot estimation mode described above, the turbine operation in the slow unload estimation mode is varied over a slowly varying load range, collecting the sequence of exhaust temperature measurements over the load range. This is also illustrated in FIG. 1. Prior to being inputted into the model-based estimator 28, the exhaust temperature profile sequence is first normalized at block 24 to obtain a detailed and more accurate temperature profile at a desired reference load condition, by correcting for the change in swirl and average exhaust temperature with respect to the reference load condition.

A normalized exhaust temperature profile 26 is then used as input to the same model-based estimator 28 to calculate the turbine inlet temperature profile 30 from the combustion cans, thereby identifying the hot and cold cans as shown in plot 32. Because the normalized exhaust temperature profile 26 is more detailed and less susceptible to individual exhaust thermocouple measurement bias, the slow unload estimation mode provides a more accurate and robust estimate of the turbine inlet temperature profile 30, using more data collected over a varying load range and increased computation for the extra normalization step. The normalization process is discussed in greater detail hereinafter.

In applying the model-based estimator 28 to the exhaust temperature measurements directly in the snapshot mode or the normalized exhaust temperature profile obtained in the slow unload mode, a set of modeling equations (derived from fundamental physical principles) are used for each nozzle and bucket section of the three turbine stages 16, as well as for the exhaust diffuser 18. The variables included in each equation relate to input and output pressure, temperature and velocity. In addition, the velocity variables will further include both a z-axis component and a θ-axis component.

In the nozzle section of each of the turbine stages, the model used in the estimator applies mass balance equations, energy balance equations and isentropic relation equations. Moreover, these equations are applied to individual divisions or "θ-sections" of the nozzle section, along the θ-axis. In this embodiment, the nozzle section "N" of a given stage is partitioned into 24 equal θ-sections; thus each θ-section covers 15 degrees of the polar θ-axis. The term "j" is used hereinafter to designate a given one of the 24 θ-sections.

Figure 2:
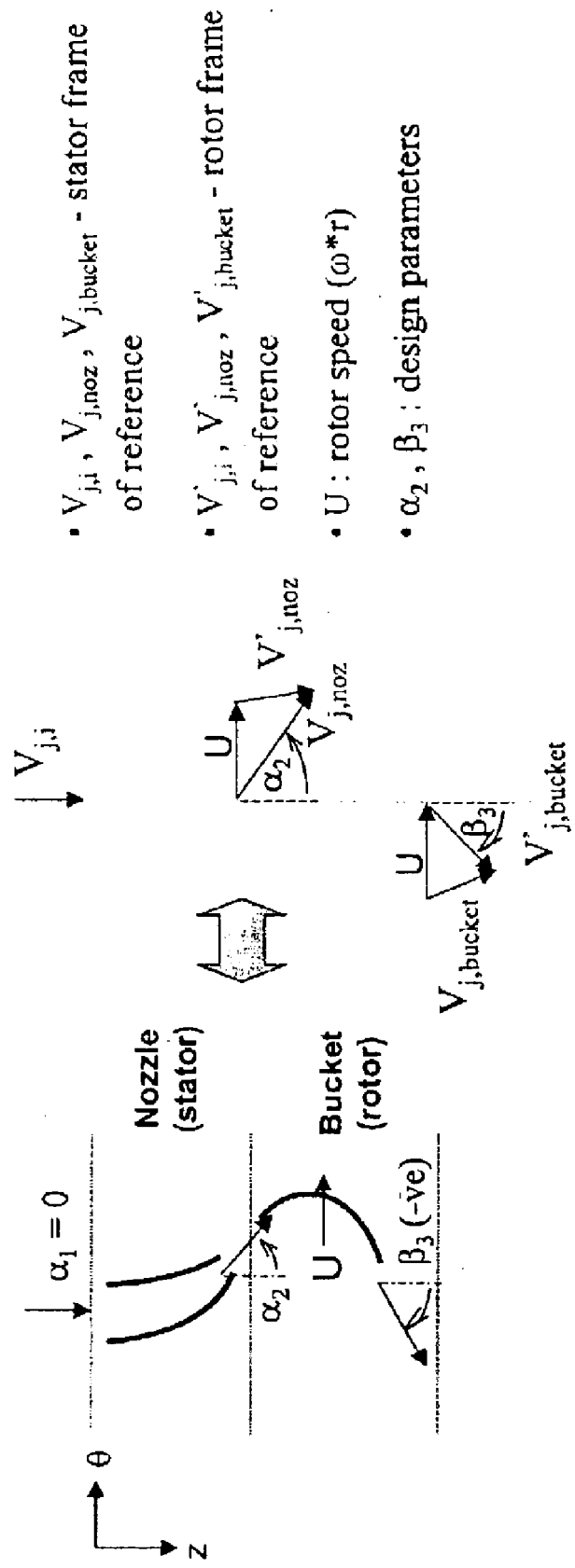
FIG. 2 is a schematic diagram that models the flow pattern of the turbine gas as it travels through a nozzle section and then a bucket section of any of the turbine stages.

FIG. 2 is a schematic diagram that models the flow pattern of the gas as it travels through a nozzle section "N" and then a bucket section "B" of any of the turbine stages 16. The parameters $V_{j,i}$, $V_{j,noz}$ and $V_{j,bucket}$ represent the input velocity the nozzle velocity and the bucket velocity of the gas from the stator frame of reference, respectively, while the parameters $V'_{j,i}$, $V'_{j,noz}$ and $V'_{j,bucket}$ represent the input velocity the nozzle velocity and the bucket velocity of the gas from the rotor frame of reference, with respect to the rotor rotating at a mean tangential speed U that is fixed. As is shown, the gas initially enters the nozzle at an initial angle, $\alpha_1$, of 0 with respect to the z-axis. However, as the gas is directed through the nozzle, there is an angular component imparted to the velocity due the physical configuration of the nozzle. Thus, the gas emerges from the nozzle at an angle $\alpha_2$ and a velocity of $V_{j,noz}$ with respect to the stator frame of reference, wherein $\alpha_2$ is function of the design parameters of the nozzle.

Then, as the gas exits the nozzle and enters the bucket of a particular stage, it is redirected by the physical configuration of the bucket by an angle $\beta_3$ with respect to the z-axis in the rotor's frame of reference, as shown by the velocity vector $V'_{j,bucket}$ in FIG. 2. As is the case with the nozzle angle $\alpha_2$, $\beta_3$ is a function of the design parameters of the bucket.

Accordingly, for the turbine nozzles, the nozzle model equations (for $j^{th}$ θ-section) are given as follows:

For an unchoked flow nozzle (stages 2 and 3):

$$\text{Mass Balance:} \quad \frac{P_{j,i}}{RT_{j,i}} V_{j,i} A_i = \frac{P_{j,noz}}{RT_{j,noz}} V_{j,noz} A_{noz}$$

$$\text{Energy Balance:} \quad T_{j,i} + \frac{V_{j,i}^2}{2c_p} = T_{j,noz} + \frac{V_{j,noz}^2}{2c_p}$$

$$\text{Isentropic Relation:} \quad P_{j,i}^{1-\gamma} T_{j,i}^\gamma = P_{j,noz}^{1-\gamma} T_{j,noz}^\gamma$$

where $\gamma$ is the specific heat ratio, $c_p$ is heat capacity at constant pressure, $A_i$ is the cross-sectional area of the nozzle inlet, $A_{noz}$ is the cross-sectional area of the nozzle outlet, and R is a constant.

For a choked flow nozzle (stage 1):

$$\text{Inlet Flow Velocity:} \quad V_{j,i} = B\left(\frac{A_{noz}}{A_i}\right)\sqrt{\gamma RT_{j,i}}$$

$$\text{with } B = \left(\frac{2}{\gamma+1}\right)^{\frac{0.5(\gamma+1)}{\gamma-1}} \text{ and } \gamma = \frac{c_p}{c_p - R}$$

$$\text{Outlet } T, V, P: \quad T_{j,noz} = \frac{2c_p T_{j,i} + V_{j,i}^2}{2c_p + \gamma R}; \quad V_{j,noz} = \sqrt{\gamma RT_{j,noz}};$$

$$P_{j,noz} = P_{j,i}\left(\frac{T_{j,noz}}{T_{j,i}}\right)^{\frac{\gamma}{\gamma-1}}$$

The calculated outlet parameters, T, P, $V_z$, $V^\theta$, from the nozzle stage then become inputs to the bucket section.

Figure 3:
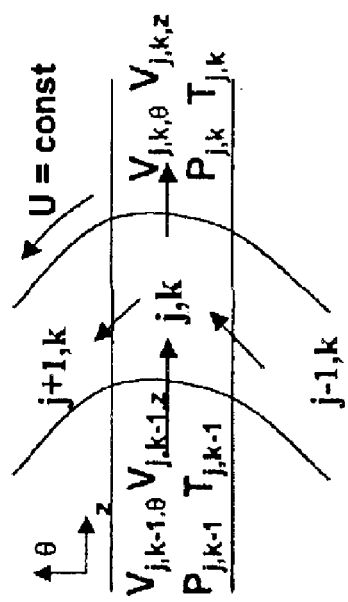
FIG. 3 is another schematic diagram that models the flow pattern of the gas as it travels through a bucket section.

Referring now to FIG. 3, there is shown another schematic diagram that particularly models the flow pattern of the gas as it travels through a bucket section. For the bucket sections, the model used in the estimator 28 applies mass balance equations, momentum balance equations (for both z and θ directions), and energy balance equations. In addition to partitioning the bucket sections into θ-sections along the θ-axis, the estimator 28 also partitions the bucket sections into 6 z-sections along the z-axis. The term "k" is used hereinafter to designate a given one of the 6 z-sections. Accordingly, for the turbine buckets, the bucket model equations (for any $k^{th}$ z-section and $j^{th}$ θ-section) are as follows:

Mass Balance:

$$\frac{d}{dt}\left(\frac{P_{j,k}V_T}{RT_{j,k}}\right) = \left\{\left(\frac{P_{j,k-1}}{RT_{j,k-1}}\right)V_{j,k-1,z}A_{k-1,z} - \left(\frac{P_{j,k}}{RT_{j,k}}\right)V_{j,k,z}A_{k,z}\right\} +$$
$$\left\{\left(\frac{P_{j-1,k}}{RT_{j-1,k}}\right)V_{j-1,k,\theta}A_{k,\theta} - \left(\frac{P_{j,k}}{RT_{j,k}}\right)V_{j,k,\theta}A_{k,\theta}\right\}$$

Momentum Balance, z-direction:

$$\frac{d}{dt}\left(\frac{P_{j,k}r_k V_T V_{j,k,z}}{RT_{j,k}}\right) = \left\{\left(\frac{P_{j,k-1}}{RT_{j,k-1}}\right)V_{j,k-1,z}^2 A_{k-1,z} - \left(\frac{P_{j,k}}{RT_{j,k}}\right)V_{j,k,z}^2 A_{k,z}\right\} +$$
$$\left\{\left(\frac{P_{j-1,k}}{RT_{j-1,k}}\right)V_{j-1,k,\theta}V_{j-1,k,z}A_{k,\theta} -$$
$$\left(\frac{P_{j,k}}{RT_{j,k}}\right)V_{j,k,\theta}V_{j,k,z}A_{k,\theta}\right\} +$$
$$\{P_{j,k-1}A_{k-1,z} - P_{j,k}A_{k,z}\} - [\nabla \cdot \tau]_Z$$

Angular Momentum Balance, θ-direction:

$$\frac{d}{dt}\left(\frac{P_{j,k}r_k V_T V_{j,k,\theta}}{RT_{j,k}}\right) = \left\{\left(\frac{P_{j-1,k}}{RT_{j-1,k}}\right)r_k V_{j-1,k,\theta}^2 A_{k,\theta} - \left(\frac{P_{j,k}}{RT_{j,k}}\right)r_k V_{j,k,\theta}^2 A_{k,\theta}\right\} +$$
$$\left\{\left(\frac{P_{j,k-1}}{RT_{j,k-1}}\right)r_{k-1}V_{j,k-1,z}V_{j,k-1,\theta}A_{k,\theta} -$$
$$\left(\frac{P_{j,k}}{RT_{j,k}}\right)r_k V_{j,k,z}V_{j,k,\theta}A_{k,z}\right\} +$$
$$\{P_{j-1,k}A_{k,\theta} - P_{j,k}A_{k,\theta}\}r_k - [\nabla \cdot \tau]r_k - \tau_{j,k,\theta}$$

where $$\tau_{j,k,\theta} = \frac{Ws_{j,k}}{\omega}, r_k \bigg|$$

is the mean (hub & tip) radius of the buckets in the $k^{th}$ z-section, and ω is the rotational speed of the rotors in radians/s, which is generally fixed by the power grid frequency (e.g., 50 or 60 Hz).

Energy Balance:

$$\frac{d}{dt}\left(\frac{P_{j,k}V_T E_{j,k}^V}{RT_{j,k}}\right) =$$
$$\left\{\left(\frac{P_{j,k-1}}{RT_{j,k-1}}\right)V_{j,k-1,z}A_{j,k-1,z}E_{P,j,k-1} - \left(\frac{P_{j,k}}{RT_{j,k}}\right)V_{j,k,z}A_{k,z}E_{P,j,k}\right\} + A_{k,\theta}$$
$$\left\{\left(\frac{P_{j-1,k}}{RT_{j-1,k}}\right)V_{j-1,k,z}E_{P,j-1,k} - \left(\frac{P_{j,k}}{RT_{j,k}}\right)V_{j,k,z}E_{P,j,k}\right\} - \nabla \cdot [\tau \cdot V] - Ws_{j,k}$$

where $E_{P,j,k} = C_P(T_{j,k} - T_R) + \frac{1}{2}(V_{j,k,z}^2 + V_{j,k,\theta}^2)$ and $Ws_{j,k} = \left(\frac{P_{j,k}V_{j,k,z}A_{k,z}}{RT_{j,k}}\right)\frac{U[V_{j,nozzle,\theta} - (U + V_{j,n_z,z}\tan(\beta_3))]}{n_z}$ The outlet parameters, T, P, $V_z$ and $V_q$ from the last z-section of the bucket of each stage become the inputs to the following stage (2 or 3) nozzles, or the exhaust diffuser 18 in the case of last turbine stage (3).

Figure 4:
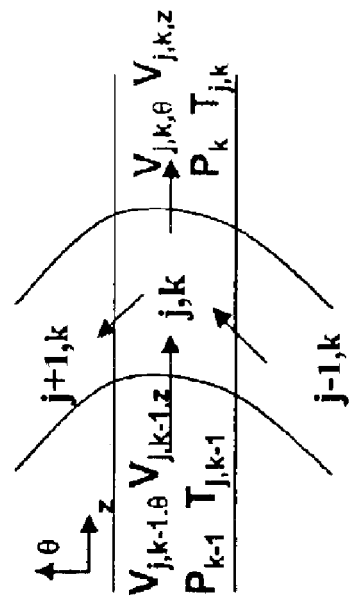
FIG. 4 is a schematic diagram that models the flow pattern of the gas as it travels through the exhaust diffuser section of the turbine.

Referring now to FIG. 4, there is shown another schematic diagram that particularly models the flow pattern of the gas as it travels through the exhaust diffuser 18. For this component, the estimator 28 is based upon a model that applies mass balance equations, energy balance equations, and momentum balance equations, including angular momentum balance in the θ-direction for each z-section and total momentum balance in the z-direction for each z-section summed over all θ-sections. For modeling purposes, uniform pressure across all θ-sections is assumed. The exhaust diffuser 18 is partitioned into 48 θ-sections, and further into 8 z-sections. Accordingly, for the exhaust diffuser section of the turbine, the diffuser model equations (for the $k^{th}$ z-section & $j^{th}$ θ-section) are given as follows:

Mass Balance:

$$\frac{d}{dt}\left(\frac{P_{j,k}V_T}{RT_{j,k}}\right) = \left\{\left(\frac{P_{j,k-1}}{RT_{j,k-1}}\right)V_{j,k-1,z}A_{k-1,z} - \left(\frac{P_{j,k}}{RT_{j,k}}\right)V_{j,k,z}A_{k,z}\right\} +$$
$$\left\{\left(\frac{P_{j-1,k}}{RT_{j-1,k}}\right)V_{j-1,k,\theta}A_{k,\theta} - \left(\frac{P_{j,k}}{RT_{j,k}}\right)V_{j,k,\theta}A_{k,\theta}\right\}$$

Total Momentum Balance z-direction (for all j θ-sections):

$$\frac{d}{dt}\left(\frac{P_k V_T V_{j,k,z}}{RT_{j,k}}\right) = \left\{\left(\frac{P_{k-1}}{RT_{j,k-1}}\right)V_{j,k-1,z}^2 A_{k-1,z} - \left(\frac{P_k}{RT_{j,k}}\right)V_{j,k,z}^2 A_{k,z}\right\} +$$
$$(P_{k-1}A_{k-1,z} - P_{k,z}A_{k,z}) +$$
$$\left\{\left(\frac{P_k}{RT_{j-1,k}}\right)V_{j-1,k,\theta}V_{j-1,k,z}A_{k,\theta} - \left(\frac{P_k}{RT_{j,k}}\right)V_{j,k,\theta}V_{j,k,z}A_{k,\theta}\right\} +$$
$$\frac{1}{2}(P_{k-1} + P_k)(A_{k,z} - A_{k-1,z})$$

Where $P_{jk}=P_k$ for all j

Angular Momentum Balance θ-direction:

$$\frac{d}{dt}\left(\frac{P_k r_k V_T V_{j,k,\theta}}{RT_{j,k}}\right) = \left\{\left(\frac{P_k}{RT_{j-1,k}}\right)r_k V_{j-1,k,\theta}^2 A_{k,\theta} - \left(\frac{P_k}{RT_{j,k}}\right)r_k V_{j,k,\theta}^2 A_{k,\theta}\right\} +$$
$$\left\{\left(\frac{P_{k-1}}{RT_{j,k-1}}\right)r_{k-1}V_{j,k-1,z}V_{j,k-1,\theta}A_{k-1,z} - \left(\frac{P_k}{RT_{j,k}}\right)r_k V_{j,k,s}V_{j,k,\theta}A_{k,z}\right\}$$

Energy Balance:

$$\frac{d}{dt}\left(\frac{P_k V_T E_{j,k}^V}{RT_{j,k}}\right) = \left\{\left(\frac{P_{k-1}}{RT_{j,k-1}}\right)V_{j,k-1,z}A_{k-1,z}E_{P,j,k-1} -$$
$$\left(\frac{P_k}{RT_{j,k}}\right)V_{j,k,z}A_{k,z}E_{P,j,k}\right\} +$$
$$A_{k,\theta}\left\{\left(\frac{P_k}{RT_{j-1,k}}\right)V_{j-1,k,z}E_{P,j-1,k} - \left(\frac{P_k}{RT_{j,k}}\right)V_{j,k,z}E_{P,j,k}\right\}$$

where $E_{P,j,k} = C_P(T_{j,k} - T_R) + \frac{1}{2}(V_{j,k,z}^2 + V_{j,k,\theta}^2)$ FIG. 5 is a table summarizing the simulation results of the developed steady-state physics-based model described above using actual design parameters for a General Electric 6FA turbine. The simulation results were compared to measured values obtained from the 6FA turbine during a slow unload operation from base-load (69.7 MW) to part-load (45 MW). The measured data during the slow unload was compared against the model's predictions in order to validate the model. In particular, column 52 shows the mean firing temperature TTRF for all combustion cans, while column 54 shows and the corresponding mean exhaust temperature TTXM and column 56 shows the swirl as the turbine operation was varied from 69.7 MW to 45 MW. The mean firing temperature was used to generate a uniform temperature profile with peak temperatures for the 6 cans and trough temperatures at the neighboring can interfaces as shown in columns 57 (Tinp@peak) and 58 (Tinp@trough), respectively.

The peak and trough temperatures were used, along with other measured inputs such as compressor discharge pressure CPDa (atm) and compressor discharge pressure CTD (F), to simulate the model at each of the load conditions and obtain the predictions for mean exhaust temperature TTXM in column 60 and swirl in column 62. Comparisons of the measured and predicted TTXM (columns 54 and 60) and swirl (columns 56 and 62) at each of the load conditions show that the predicted model data tracks well with the actual measured data. For example, the model prediction for mean exhaust temperature (TTXM) is within 6 degrees of the measured values. Thus, the model is validated with actual measurements on a 6FA turbine and can be used in the model-based estimation to calculate the unknown combustor can temperatures from the measured exhaust temperature profile in either the snapshot or the slow unload mode.

Figure 6B:
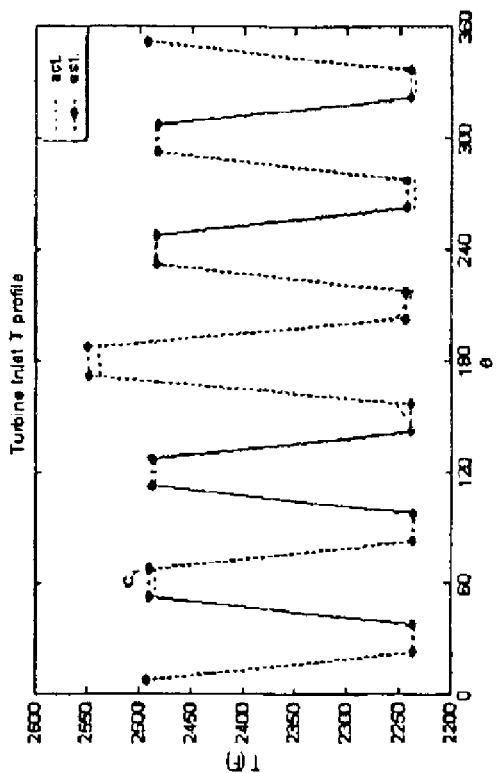
FIGS. 6(a) and 6(b) are graphs that compare, at base load, estimated and actual turbine exhaust data and estimated and actual turbine inlet temperature, when one of the combustor cans is running hotter with respect to the other cans.
Figure 6A:
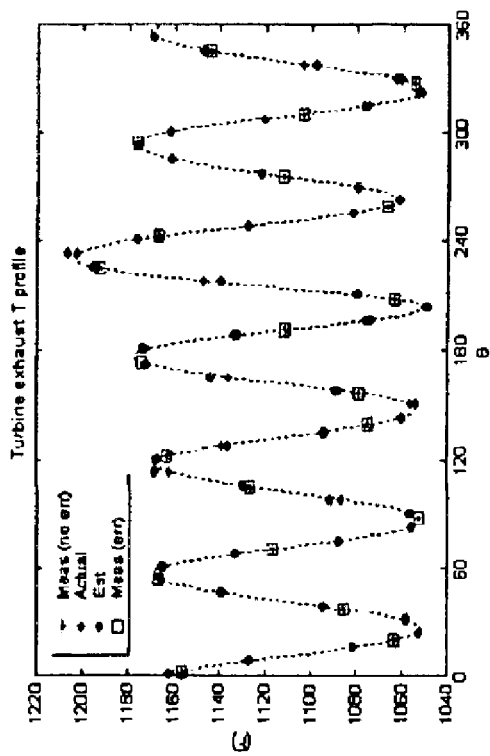

Whenever one (or more) of the combustion cans is operating above or below a desired temperature, it is desired to be able to readily identify the can or cans. Accordingly, the results of another simulation, at base load, are shown in FIGS. 6(a) and 6(b), wherein one of the cans (located at θ=180°) is running about 55° hotter then the other five. From the measured turbine exhaust data (taken from the 21 thermocouples) shown in the graph of FIG. 6(a), the estimator predicts the turbine inlet temperature profile, shown in FIG. 6(b). The estimated turbine inlet temperature profile from the cans shown in FIG. 6(b) correlates well with the actual inlet temperature profile, and the model also correctly identifies that the can at 180° is the one running hot. It will also be noted that the temperature of exhaust gas, as a result of the hot can, is manifested at the turbine exhaust at about the 240° position due to the swirl.

Figure 7B:
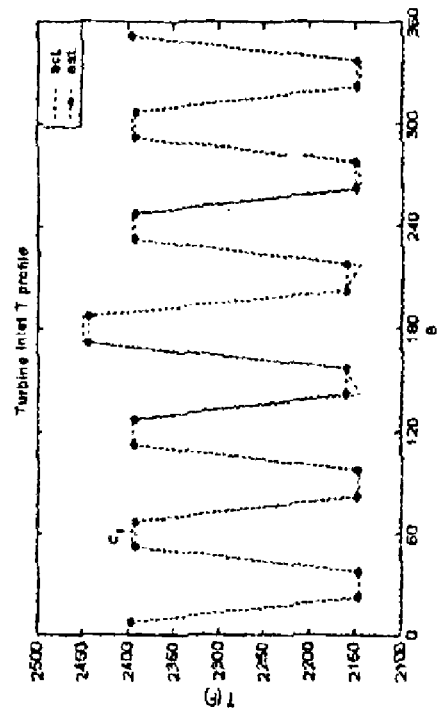
FIGS. 7(a) and 7(b) are graphs that compare, at part load, estimated and actual turbine exhaust data and estimated and actual turbine inlet temperature, when one of the combustor cans is running hotter with respect to the other cans.
Figure 7A:
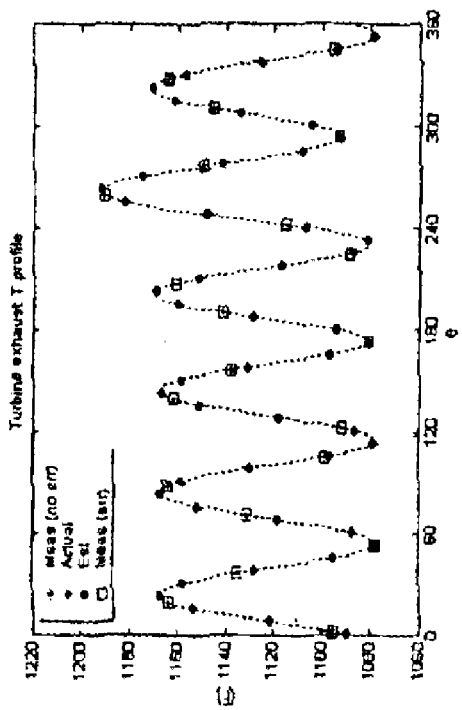

The model for the "one hot can" simulation also holds for a part load condition, as illustrated in FIGS. 7(a) and 7(b). In FIG. 7(a), the exhaust temperature profile reveals a hot temperature at about the 265° degree mark, again reflecting a greater swirl at a decreased load. Again in FIG. 7(b), the estimated inlet temperature profile shown in red tracks the actual profile shown in blue, and identifies the hot can at 180°.

Figure 8B:
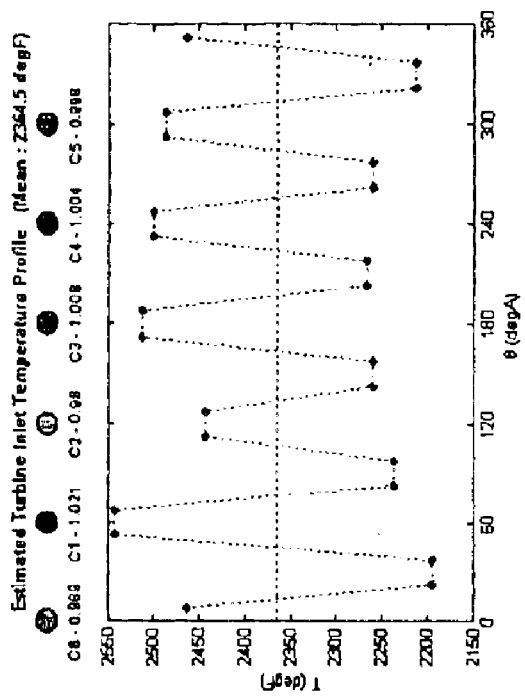
FIGS. 8(a) and 8(b) are graphs of measured exhaust temperature at base-load condition and corresponding estimated inlet temperature in the snapshot estimation mode, respectively, with a positive bias on one of the exhaust temperature thermocouples.
Figure 8A:
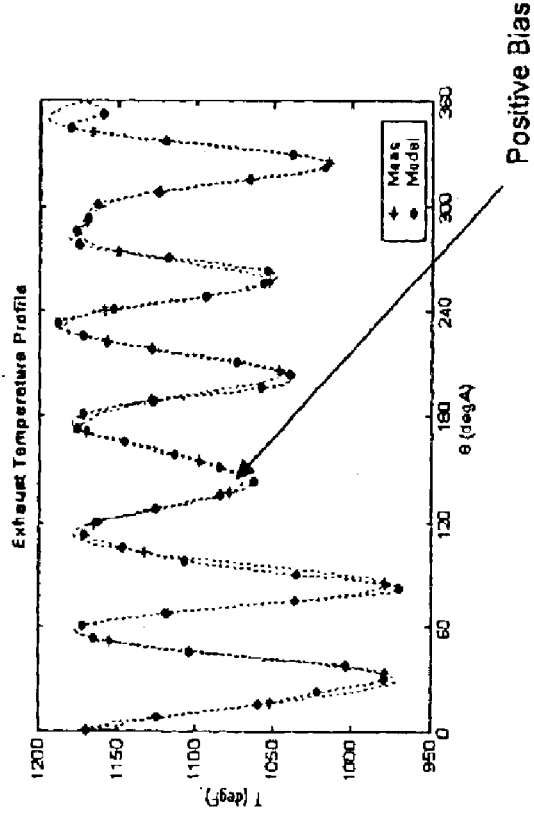

FIGS. 8(a) and 8(b) show the actual measured exhaust temperature profile in a General Electric 6FA machine using 21 thermocouples at base load, and the calculated turbine inlet temperature profile from the six combustor cans using the snapshot estimation mode. According to this estimated turbine inlet profile shown in FIG. 8 (b), one of the combustor cans (C1) is operating hotter than the mean inlet temperature, while two other cans (C6, C2) are operating cooler than the mean inlet temperature. The remaining cans (C3, C4 and C5) are operating in normal acceptable range of the mean inlet temperature. However, since the snapshot estimation mode uses fixed measurements by the 21 exhaust thermocouples at fixed load, the exhaust temperature profile used in the model-based estimation can be corrupted by any thermocouple measurement biases. In this particular example, one of the thermocouples had a large positive bias, as shown in FIG. 8(a), and resulted in a high trough temperature. Consequently, this affected the accuracy of the estimated inlet temperature profile in FIG. 8(b). The high susceptibility of the estimation result to thermocouple measurement biases can be alleviated by using the normalized exhaust temperature in the slow unload estimation mode.

Figure 9:
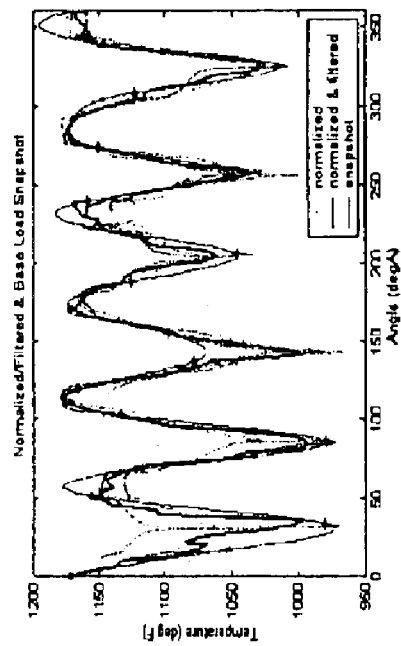
FIG. 9 is a graph illustrating a comparison between exhaust temperature snapshot data at base-load and the normalized, filtered data corresponding to the same base-load conditions resulting from a normalization step applied to the exhaust temperature obtained during a slow unload from base-load to part-load conditions.

FIG. 9 illustrates a comparison of a normalized exhaust temperature profile obtained from a sequence of exhaust temperature measurements during a slow unload, with the snapshot measured at fixed base load. In particular, the snapshot curve shows the profile obtained by the snapshot measurement at base load, which is the same as shown in FIG. 8(a). As the load is varied from base load to part load, the swirl increases, and thus the temperature profile rotates with respect to the exhaust thermocouple locations. Effectively, the same fixed thermocouples provide measurements of the exhaust profile at different θ locations. In particular, for a large enough variation in load and thus swirl, the same hot and cold spots are measured by two or more neighboring thermocouples, thereby providing a measure of relative bias between the thermocouples.

The normalization block 24 in FIG. 1 uses the sequence of exhaust temperature measurements over the slowly varying load range to correct for (1) mean temperature shift, and (2) swirl variation with respect to a desired reference load condition (e.g., a base load condition in this case). Moreover, with respect to swirl variation, there is a correction for both bulk swirl (mean swirl) and for local swirl. The normalized temperature data is then filtered to use overlapping temperature measurements from neighboring thermocouples to obtain a normalized and filtered exhaust temperature profile shown in FIG. 9. As can be seen, the normalized exhaust temperature profile is more detailed than the profile from the snapshot measurement with the 21 thermocouples. In addition, the filtering alleviates the problem with thermocouple-to-thermocouple measurement bias and, in this case, captures the trough at roughly 150 degrees more accurately than with a single snapshot measurement susceptible to measurement bias errors.

Figure 10B:
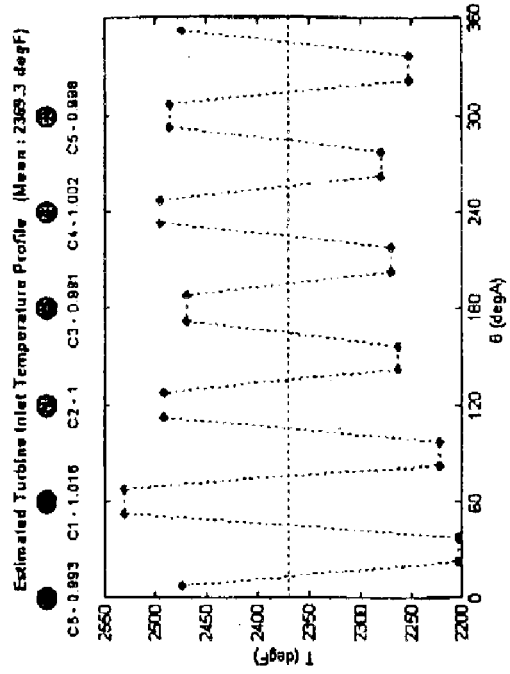
FIGS. 10(a) and 10(b) are graphs of the normalized, filtered exhaust temperature at base-load and corresponding estimated inlet temperature, respectively, obtained during the slow unload estimation mode, in which the positive bias of the thermocouple is compensated by normalization.
Figure 10A:
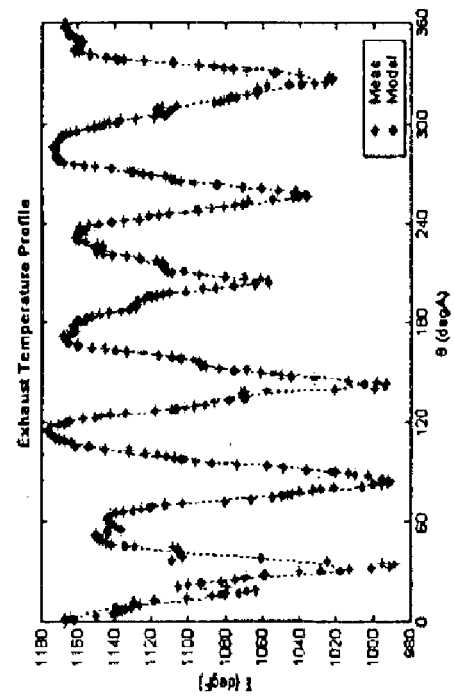

Finally, FIGS. 10(a) and 10(b) illustrate the results of using normalized data in conjunction with the model-based estimator. In particular, the graph of FIG. 10(a) represents the normalized exhaust temperature (as compared with the snapshot/fixed load data of FIG. 8(a)), and the graph of FIG. 10(b) represents the estimated turbine inlet temperature profile based on the normalized exhaust temperature data. It will now be noted that combustor cans C2 and C6 are no longer identified as operating cooler than the mean temperature, although C1 is still identified as operating hotter than the mean temperature.

The estimation using the normalized exhaust data in slow unload mode is thus more accurate and less susceptible to individual exhaust thermocouple bias errors and, as such, is a preferred mode of estimation. On the other hand, since this mode implements a slow controlled load variation (which may not always be practical to perform), the snapshot mode could be used, bearing in mind the possibility of unknown thermocouple biases. It is possible that over time, as multiple slow unloads are performed, one can obtain historical data on the biases for each thermocouple by comparing the snapshot and normalized exhaust temperature profiles and then use this historical bias data to correct the snapshot measurement and improve the performance of the snapshot estimation mode. Moreover, even though normalization from a controlled slow-unload is the preferred method of estimation, the normalization may also be accomplished through data from regularly varying, day-today load variations, assuming those variations are sufficiently large.

Through the use of the above described temperature estimation method and system, a more accurate estimation of the turbine inlet temperatures (i.e., the individual combustor can firing temperatures) by position may be obtained. In turn, detected variances in individual combustor can temperature may result in quicker diagnostic capability, improved emissions estimation, T-fire optimization, and may eventually lead to control of individual fuel supply to the combustor cans themselves to correct for estimated can-to-can variations and maintain a uniform firing temperature across all cans.

As will also be appreciated, the disclosed invention can be embodied in the form of computer or controller implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The present invention may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for estimating a temperature profile for individual combustion cans at an inlet of a gas turbine, the method comprising:
   determining an exhaust temperature profile of exhaust gas of the gas turbine; and
   inputting said exhaust temperature profile into a model-based estimator of turbine components through which turbine gas flows;
   wherein said model-based estimator calculates an estimated inlet temperature profile at the gas turbine inlet, based upon said exhaust temperature profile and design parameters of the gas turbine, said estimate inlet temperature profile being indicative of the actual firing temperature of each of the individual combustion cans.

2. The method of claim 1, wherein said determining an exhaust temperature profile comprises obtaining exhaust temperature data from a plurality of temperature thermocouples circumferentially disposed about a longitudinal axis of the turbine.

3. The method of claim 1, wherein said model-based estimator applies a set of equations for each stage of the turbine, said set of equations relating input temperature, pressure, longitudinal velocity and tangential velocity of the turbine gas to output temperature, pressure, longitudinal velocity and tangential velocity of the turbine gas.

4. The method of claim 3, wherein:
   each stage of the turbine includes a nozzle section and a bucket section;
   the turbine further includes an exhaust diffuser in which said thermocouples are located;
   for each of said nozzle sections, said set of equations include a mass balance equation, an energy balance equation and an isentropic relation equation;
   for each of said bucket sections, said set of equations include a mass balance equation, a momentum balance equation, and an energy balance equation; and
   for said exhaust diffuser, said set of equations includes a mass balance equation a momentum balance equation, and an energy balance equation.

5. The method of claim 4, wherein said momentum balance equations for said bucket sections and said exhaust diffuser include angular momentum balance and longitudinal momentum balance.

6. A method for estimating a temperature profile for individual combustion cans at an inlet of a gas turbine, the method comprising:
   obtaining exhaust temperature data from exhaust of the gas turbine;
   normalizing said exhaust temperature data to a reference load condition to obtain a normalized exhaust temperature profile;
   inputting said normalized exhaust temperature profile into a model-based estimator of turbine components through which turbine gas flows;
   wherein said model-based estimator calculates an estimated inlet temperature profile at the gas turbine inlet, based upon said normalized exhaust temperature profile and design parameters of the gas turbine, said estimate inlet temperature profile being indicative of the actual firing temperature of each of the individual combustion cans.

7. The method of claim 6, wherein said normalizing said exhaust temperature data further comprises obtaining exhaust temperature data under varying load conditions.

8. The method of claim 7, wherein said normalizing said exhaust temperature data further comprises obtaining exhaust temperature snapshots from a base load and further obtaining exhaust temperature snapshots from progressively smaller loads down to a part load, wherein data from said exhaust temperature snapshots are corrected for mean temperature shift and swirl variation.

9. The method of claim 6, wherein said determining an exhaust temperature profile comprises obtaining exhaust temperature data from a plurality of temperature thermocouples circumferentially disposed about a longitudinal axis of the turbine.

10. The method of claim 6, wherein said model-based estimator applies a set of equations for each stage of the turbine, said set of equations relating input temperature, pressure, longitudinal velocity and tangential velocity of the turbine gas to output temperature, pressure, longitudinal velocity and tangential velocity of the turbine gas.

11. The method of claim 10, wherein:

each stage of the turbine includes a nozzle section and a bucket section;

the turbine further includes an exhaust diffuser in which said thermocouples are located;

for each of said nozzle sections, said set of equations include a mass balance equation, an energy balance equation and an isentropic relation equation;

for each of said bucket sections, said set of equations include a mass balance equation, a momentum balance equation, and an energy balance equation; and for said exhaust diffuser, said set of equations includes a mass balance equation a momentum balance equation, and an energy balance equation.

12. The method of claim 11, wherein said momentum balance equations for said bucket sections and said exhaust diffuser include angular momentum balance and longitudinal momentum balance.

13. A system for estimating a temperature profile for individual combustion cans disposed at an inlet of a gas turbine, comprising:

a plurality of exhaust temperature sensing devices disposed proximate exhaust gas of the gas turbine;

a normalization mechanism for receiving exhaust temperature data from said plurality of exhaust temperature sensing devices, said normalization mechanism producing a normalized exhaust temperature profile with respect to a reference load condition;

a model-based estimator of turbine components through which turbine gas flows, said model-based estimator receiving said normalized exhaust temperature profile;

wherein said model-based estimator calculates an estimated inlet temperature profile at the gas turbine inlet, based upon said normalized exhaust temperature profile and design parameters of the gas turbine, said estimate inlet temperature profile being indicative of the actual firing temperature of each of the individual combustion cans.

14. The system of claim 13, wherein said normalization mechanism obtains exhaust temperature data under varying load conditions.

15. The system of claim 14, wherein said normalization mechanism said receives exhaust temperature snapshots from a base load and further receives exhaust temperature snapshots from progressively smaller loads down to a part load, wherein data from said exhaust temperature snapshots are corrected for mean temperature shift and swirl variation.

16. The system of claim 13, wherein plurality of exhaust temperature sensing devices further comprises a plurality of temperature thermocouples circumferentially disposed about a longitudinal axis of the turbine.

17. The system of claim 13, wherein said model-based estimator applies a set of equations for each stage of the turbine, said set of equations relating input temperature, pressure, longitudinal velocity and tangential velocity of the turbine gas to output temperature, pressure, longitudinal velocity and tangential velocity of the turbine gas.

18. The system of claim 17, wherein:

each stage of the turbine includes a nozzle section and a bucket section;

the turbine further includes an exhaust diffuser in which said thermocouples are located;

for each of said nozzle sections, said set of equations include a mass balance equation, an energy balance equation and an isentropic relation equation;

for each of said bucket sections, said set of equations include a mass balance equation, a momentum balance equation, and an energy balance equation; and for said exhaust diffuser, said set of equations includes a mass balance equation a momentum balance equation, and an energy balance equation.

19. The system of claim 18, wherein said momentum balance equations for said bucket sections and said exhaust diffuser include angular momentum balance and longitudinal momentum balance.

20. A storage medium, comprising:

a machine readable computer program code for estimating a temperature profile for individual combustion cans at an inlet of a gas turbine; and instructions for causing a computer to implement a method, the method further comprising:

obtaining exhaust temperature data from exhaust of the gas turbine;

normalizing said exhaust temperature data to a reference load condition to obtain a normalized exhaust temperature profile;

inputting said normalized exhaust temperature profile into a model-based estimator of turbine components through which turbine gas flows;

wherein said model-based estimator calculates an estimated inlet temperature profile at the gas turbine inlet, based upon said normalized exhaust temperature profile and design parameters of the gas turbine, said estimate inlet temperature profile being indicative of the actual firing temperature of each of the individual combustion cans.

* * * * *